United States Patent [19]

Fisher

[11] 4,042,277
[45] Aug. 16, 1977

[54] SEAT BELT SYSTEM

[76] Inventor: Robert C. Fisher, 4210 N. Dixie, West Palm Beach, Fla. 33407

[21] Appl. No.: 745,663

[22] Filed: Nov. 29, 1976

Related U.S. Application Data

[63] Continuation of Ser. No. 605,667. Aug. 18, 1975, abandoned.

[51] Int. Cl.² .............................................. A47B 35/00
[52] U.S. Cl. ............................... 297/388; 200/61.58 B; 297/389
[58] Field of Search ................. 297/388, 385, 389; 280/744, 747; 242/107.4 R; 340/52 E; 200/61.58 B

[56] References Cited

U.S. PATENT DOCUMENTS

| | | | |
|---|---|---|---|
| 3,340,523 | 9/1967 | Whitman | 280/744 X |
| 3,363,712 | 1/1968 | Fontaine | 200/61.58 B |
| 3,632,059 | 1/1972 | Loose | 242/107.4 |
| 3,797,603 | 3/1974 | Loomba | 242/107.4 |
| 3,863,209 | 1/1975 | Hollins | 340/52 E |
| 3,876,031 | 4/1975 | Stouffer | 297/388 |
| 3,880,380 | 4/1975 | Sugiura | 242/107.4 |
| 3,890,003 | 6/1975 | Close | 297/388 |

Primary Examiner—James T. McCall
Attorney, Agent, or Firm—Harness, Dickey & Pierce

[57] ABSTRACT

The disclosure relates to a passenger restraint system for automobiles and the like and, more particularly, to an improved seat belt system. A seat belt is stored on floor and pillar mounted retractors. A tonque is mounted on said belt for acceptance in a complimentary buckle. The floor mounted retractor and buckle are electrically connected so as to control the condition of the retractor. Effort required of a passenger to draw the tongue across his body and couple the tongue into the buckle is minimized due to the use of relatively light springs and the absence of clutches. Moreover, spurious locking of the floor retractor is precluded.

1 Claim, 4 Drawing Figures

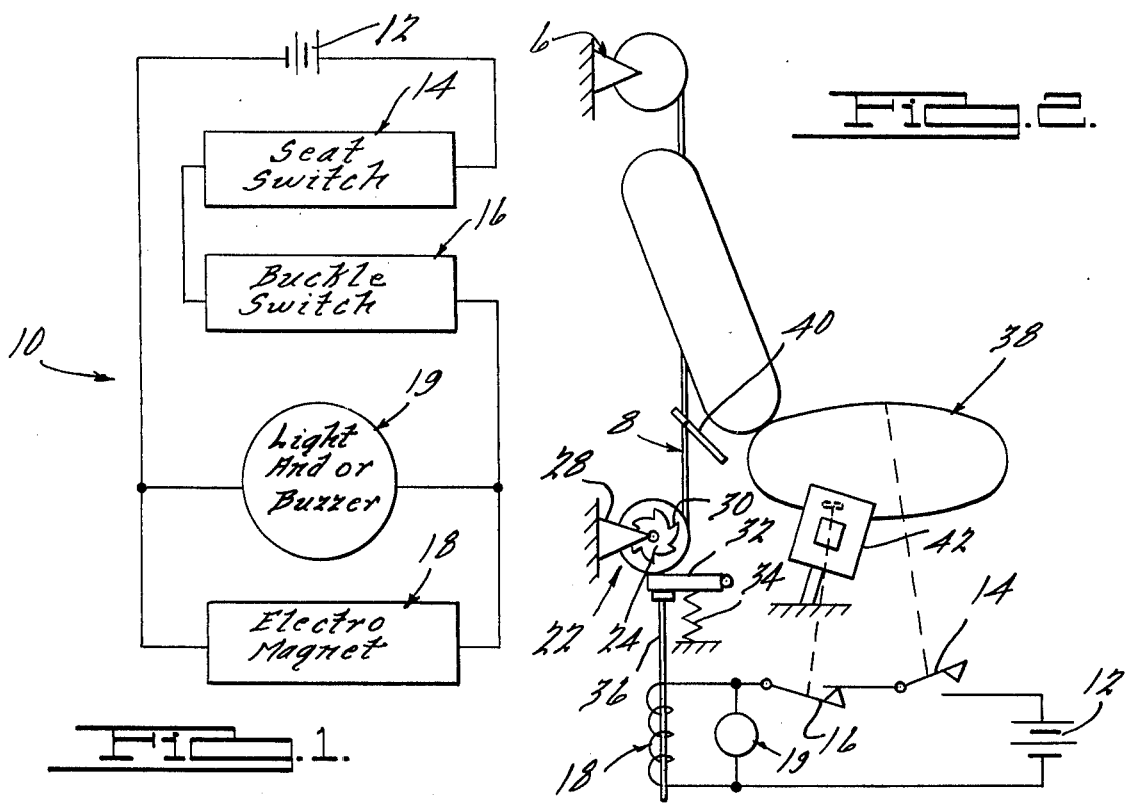
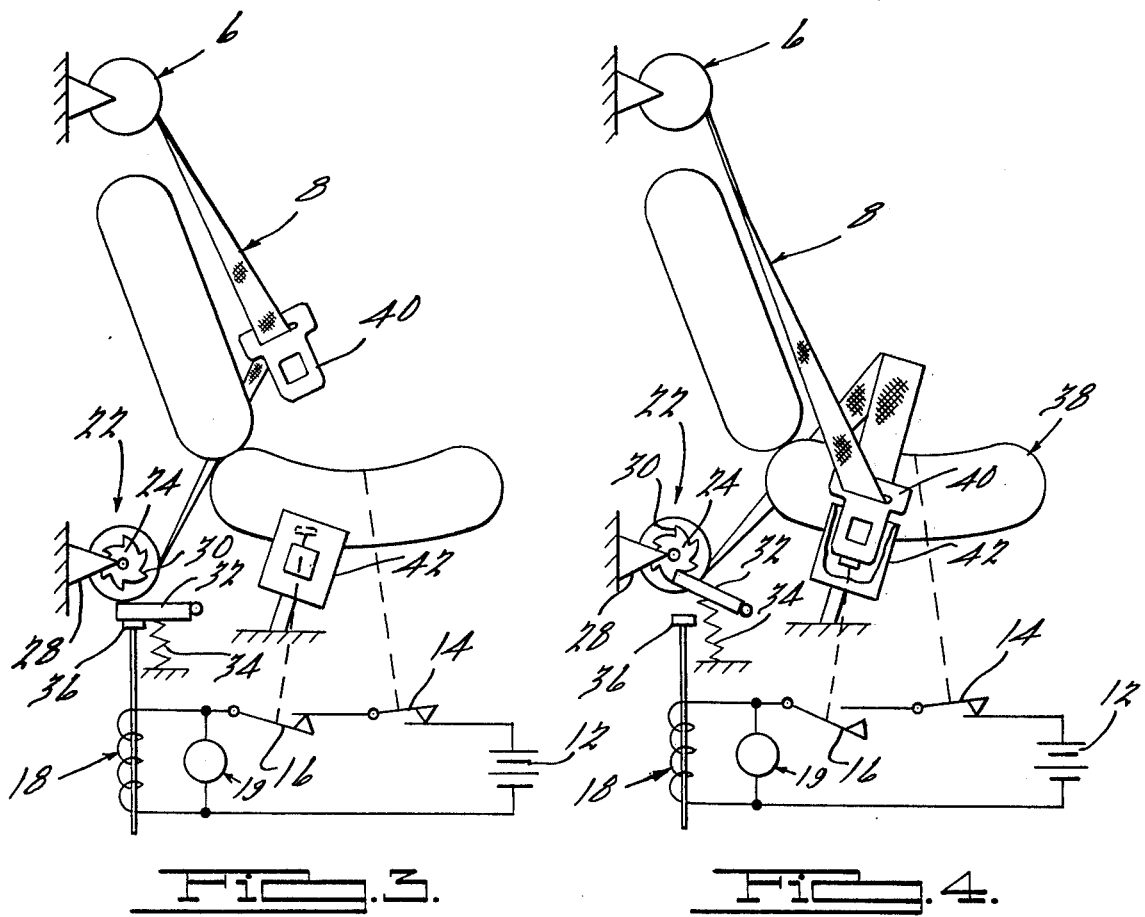

SEAT BELT SYSTEM

This is a continuation of application Ser. No. 605,667, filed Aug. 18, 1975, now abandoned.

BACKGROUND AND SUMMARY OF THE INVENTION

Reference can be had to applicant's U.S. Pat. No. 3,667,698, for Locking Seat Belt Retractor, which discloses the type of floor mounted seat belt retractor currently used in most American automobiles and over which the seat belt system of the present invention is a distinct improvement.

Seat belt retractors heretofore known and used fall into two general categories, namely, simple retractors that function only to wind up the belt and which, therefore, must be fully protracted to effectively restrain on occupant, and seat belt retractors that utilize a mechanical locking system to effect locking of the retractor at any desired point of protraction. Locking is achieved by allowing the belt to retract slightly. While the former retractor is desirable from a user's standpoint in that its spring is relatively light, it is unacceptable in view of present safety standards, since full protraction of the belt cannot be assured. The later type of locking retractor has very desirable safety characteristics, but has proved to be unacceptable to the motorist since the spring required to retract the belt concomittently drive cams, pawls and gears to energize the locking system and, therefore, is relatively heavy, tightening the belt about the user's waist to an uncomfortable degree and rendering protraction difficult. Moreover, since such known retractors lock up upon the first increment of retraction after a predetermined protraction, accidental lockup of the retractor while attempting to couple the tongue of the system into a complimentary buckle often occurs, requiring the user to allow the belt to fully retract so as to disengage the locking mechanism and thereby permit a subsequent full protraction.

The seat belt system of the present invention solves the aforementioned problems by utilizing relatively light springs to effect retraction of the seat belt and, thus, at no time present an overly tight belt to the user. Neither full protraction of the belt nor partial retraction of the belt is required since lockup, in a constructed embodiment, is controlled electrically.

When a vehicle utilizing the system of the instant invention is unoccupied, belt buildup on the retractor spool biases a locking pawl to the unlocked condition relative to a ratchet on the spool of the retractor. Upon seating of an occupant in the vehicle seat, an electromagnet is energized to hold the locking pawl of the retractor out of engagement with the ratchet thereon, permitting the seat belt to be fully protracted without the possibility of spurious lockup. After engagement of the tonuge of the belt with the complimentary seat belt buckle, the energizing circuit of the electromagnet is broken, allowing the pawl on the retractor to move into engagement with its complimentary ratchet on the retractor to lock up the seat belt system. Thus, the spring of the retractor is required to be heavy enough only to retract the tongue to the storage condition. No cam, gear, or other type of mechanism is required to be operated by the retract spring of the retractor. Moreover, spurious lockup of the seat belt system is precluded since the system is deactivated until the tongue is engaged in its complimentary buckle. The system is fail safe in operation.

DESCRIPTION OF THE DRAWING

FIG. 1 is a schematic view of the electrical circuit of the seat belt system of the instant invention;

FIG. 2 is a diagrammatic presentation of the seat belt system as applied to a vehicle seat and with the seat unoccupied;

FIG. 3 is a diagrammatic view, similar to FIG. 2, with the seat occupied and belt tongue partially protracted;

FIG. 4 is a view, similar to FIG. 3, with the seat belt tongue engaged in a complimentary buckle.

In an exemplary constructed embodiment, the system of the instant invention employs two retractors. A pillar mounted retractor 6 comprises a conventional inertia responsive locking retractor which effects locking of the portion of the seat belt 8 that extends over an occupant's shoulders upon the occurrence of a predetermined deceleration of the vehicle. During normal operation of the vehicle, the retractor 6 permits free extension of the belt 8. Such roof mounted retractors 6 characteristically have relatively light springs that minimize the effort to protract the seat belt 8. Since the seat belt 8 is normally buckled up with the automobile in the static condition, spurious locking of such inertia responsive retractors is not a problem, an inertia responsive element being in its normal or unlocked condition and, therefore, the locking system of said retractor 6 being in the unlocked condition. It is to be noted that the advantages of the present seat belt system can be obtained without utilization of the inertia retractor 6, said retractor merely enhancing the overall convenience of the system to the user.

As best seen in FIG. 1 of the drawing, the seat belt system 10 of the instant invention utilizes an electrical circuit comprising a battery 12 connected in electrical series relation with a seat sensor switch 14, a buckle switch 16 an an electromagnet 18. A light or buzzer 19 is connected in electrical parallel relation with the electromagnet 18 to give oral or visual indication that the system 10 is in the unlocked condition, as will be discussed.

As best seen in FIGS. 2-4, a floor mounted retractor 22 comprises a spool 24 for the acceptance of one end portion of the belt 8. The spool 24 is journaled on a suitable support 28. The spool 24 has a plurality of ratchet teeth 30 thereon that are engageable by a pawl 32. The pawl 32 is normally biased toward the lock condition with the ratchet teeth 30 by a spring 34.

As seen in FIG. 2 of the drawings, buildup of the belt 8 on the retractor spool 24 as the belt is retracted effects a downward bias on the pawl 32 against the spring 34. When the seat belt system 10 is in the storage condition, the belt 8 biases the pawl 32 into engagement with a fixed pole 36 of the electromagnet 18. Other mechanisms, for example as taught in my aforementioned U.S. Pat. No. 3,667,698, can be employed to bias the pawl 32 out of engagement with the ratchet teeth 30 and into engagement with the electromagnet 18. Subsequent protraction of the belt 26 reduces the accumulated diameter of the belt 8 on the spool 24, conditioning the pawl 32 for movement under the bias of the spring 34 upon deenergization of the electromagnet 18.

As seen in FIG. 2, when a vehicle seat 38 is unoccupied, the electrical circuit comprising the seat switch 14, buckle switch 16, and electromagnet 18, is deenergized since the seat switch 14 is open. Buildup of the belt 8 on the spool 24 due to retraction has biased the pawl 32 of the retractor 22 into engagement with the pole 36 of the deenergized electromagnet 18.

As best seen in FIG. 3 of the drawings, when an occupant is seated on the vehicle seat 38, the seat belt switch 14 is moved to the closed condition, energizing the electrical circuit containing the seat switch 14, buckle switch 16, and electromagnet 18. The seat occupant can then freely move a tongue 40 on the belt 8 towards engagement with a buckle 42. It should be apparent that the belt 26 is free for protraction without the possibility of spurious lockup of the retractor 22, the pawl 32 being held out of engagement with the ratchet 30 by the electromagnet 18.

As best seen in FIG. 4, when the tongue 40 on the belt 8 is engaged with the buckle 42, the buckle switch 16 is biased to the open condition, opening the circuit containing the seat switch 14, buckle switch 16 and electromagnet 18 thereby deenergizing the electromagnet 18 and releasing the pawl 32 for movement to the lock condition with respect to the ratchet teeth 30 under the bias of the spring 34.

The inertia responsive retractor provides for free retraction of the end portion of the belt 8 attached thereto. Both the inertia retractor 6 and floor retractor 22 take up any slack in the belt 8 after buckling up is completed, noting that only relatively light springs are required due to the absence of clutches, etc. in the system.

When the seat occupant unbuckles the tongue 40 from the buckle 42, both retractors 6 and 22 effect retraction of the belt 8. When the belt 8 builds up on the spool 24 of the retractor 22, the pawl 32 is again biased into engagement with the pole 36 of the electromagnet 18 conditioning the system 10 for use as described above.

From the foregoing, it should be apparent that the seat belt system of the present invention results in a locking system that, in a constructed embodiment, is electrically maintained in the unlocked condition when an occupant sits on the vehicle seat and remains in the unlocked condition until such time as the seat belt is buckled. Thereafter, the system automatically locks due to interruption of the electrical control circuit and remains in the locked condition until such time as the tongue 40 of the seat belt is removed from the buckle 42 and the belt is fully retracted. The system is fail-safe in nature in that electrical failure moves the system to the locked condition. Since the retractor 22 is devoid of clutches or other mechanical locking mechanism, the windup spring thereof can be relatively light, requiring minimum effort to be exerted by the occupant to move the tongue to the buckled up condition within the buckle 42.

What is claimed is:

1. A seat belt system for a vehicle comprising: a seat belt having a tongue thereon, a seat belt buckle, a seat belt retractor having a spool with a ratchet thereon and adapted to have one end of said seat belt wound thereupon, first resilient means normally biasing the spool of said retractor and said seat belt toward the retracted condition, a pawl engageable with the ratchet on said spool to effect locking thereof against protraction of said belt, second resilient means normally biasing said pawl toward engagement with the ratchet on said spool, an electromagnet, an electromagnet control circuit, means responsive to substantially full retraction of said belt for biasing said pawl out of engagement with the ratchet on said spool and into mechanical engagement with the said electromagnet while said electromagnet is in the deenergized condition, said electromagnet being energizable upon closure of a normally open switch connected in electrical series relation in said control circuit with said electromagnet for holding said pawl out of engagement with the ratchet on said spool, closure of said normally open switch being independent of the condition of said retractor, and a normally closed switch in said control circuit connected in electrical series relation with said normally open switch and electromagnet and movable to the open condition upon insertion of said belt tongue into said buckle whereby said electromagnet is deenergized permitting said pawl to move to the locked condition with respect to the ratchet on said spool retractor under the bias of said second resilient means.

* * * * *